(12) United States Patent
Shin

(10) Patent No.: US 9,787,930 B1
(45) Date of Patent: Oct. 10, 2017

(54) IMAGE SENSING DEVICE

(71) Applicant: SK hynix Inc., Gyeonggi-do (KR)

(72) Inventor: Min-Seok Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/236,177

(22) Filed: Aug. 12, 2016

(30) Foreign Application Priority Data

Mar. 16, 2016 (KR) ........................ 10-2016-0031513

(51) Int. Cl.
*H04N 5/374* (2011.01)
*H04N 5/378* (2011.01)
*H04N 5/372* (2011.01)
*H04N 9/04* (2006.01)
*H04N 7/01* (2006.01)

(52) U.S. Cl.
CPC ............. *H04N 5/378* (2013.01); *H04N 5/372* (2013.01); *H04N 5/374* (2013.01); *H04N 7/0135* (2013.01); *H04N 9/045* (2013.01)

(58) Field of Classification Search
CPC ........ H04N 5/378; H04N 5/372; H04N 5/374; H04N 7/0135; H04N 9/045
See application file for complete search history.

(56) References Cited

U.S. PATENT DOCUMENTS

| 2012/0318870 | A1* | 12/2012 | Ren | ........................ | H04N 9/045 235/469 |
| 2015/0296157 | A1* | 10/2015 | Shin | .................... | H04N 5/35554 348/272 |
| 2016/0112722 | A1* | 4/2016 | Rowny | .................... | H04N 9/04 348/231.2 |
| 2017/0195596 | A1* | 7/2017 | Vogelsang | ......... | H04N 5/35581 |

FOREIGN PATENT DOCUMENTS

| KR | 1020090083817 | 8/2009 |
| KR | 1020130036563 | 4/2013 |

* cited by examiner

*Primary Examiner* — Tuan Ho
(74) *Attorney, Agent, or Firm* — IP & T Group LLP

(57) ABSTRACT

An image sensing device includes: a pixel array including a plurality of pixels arranged at each cross point of rows and columns, wherein the pixel array comprises a plurality of pixel blocks, each including N pixels, N being a natural number equal to or greater than 2, wherein the pixel blocks sequentially output a plurality of pixel signals having pixel information on the same color N times during one or more single row times; a plurality of column lines suitable for sequentially transferring the plurality of pixel signals from the pixel blocks, each column line being shared by two adjacent columns and coupled to at least one of the pixel blocks; a plurality of averaging blocks suitable for grouping the pixel signals to overlap each other, into a plurality of pixel signal groups, and averaging the pixel signal groups to output a plurality of averaged pixel signals, wherein the number of the averaging blocks is smaller than the number of the column lines; and a plurality of conversion blocks suitable for converting the averaged pixel signals into a plurality of digital signals.

20 Claims, 9 Drawing Sheets

FIG. 4

| Gr56 | R56 | Gr67 | R67 | Gr78 | R78 |
| --- | --- | --- | --- | --- | --- |
| B56 | Gb56 | B67 | Gb67 | B78 | Gb78 |
| Gr12 | R12 | Gr23 | R23 | Gr34 | R34 |
| B12 | Gb12 | B23 | Gb23 | B34 | Gb34 |

FIG. 8

| Gr56 | R56 | Gr67 | R67 | Gr78 | R78 |
| --- | --- | --- | --- | --- | --- |
| B56 | Gb56 | B67 | Gb67 | B78 | Gb78 |
| Gr12 | R12 | Gr23 | R23 | Gr34 | R34 |
| B12 | Gb12 | B23 | Gb23 | B34 | Gb34 |

FIG. 12

| B56 | Gb56 | B67 | Gb67 | B78 | Gb78 |
|-----|------|-----|------|-----|------|
| Gr16 | R16 | Gr63 | R63 | Gr38 | R38 |
| B12 | Gb12 | B23 | Gb23 | B34 | Gb34 |

IMAGE SENSING DEVICE

CROSS-REFERENCE TO RELATED APPLICATIONS

The present application claims priority under 35 U.S.C. §119(a) to Korean Patent Application No. 10-2016-0031513, filed on Mar. 16, 2016, which is incorporated herein by reference in its entirety.

BACKGROUND

1. Field

Exemplary embodiments of the present invention relate generally to a semiconductor design technology and, more particularly, to an image sensing device.

2. Description of the Related Art

Image sensing devices capture images using photosensitive properties of semiconductors. Image sensing devices are often classified into charge-coupled device (CCD) image sensors and complementary metal-oxide semiconductor (CMOS) image sensors. CMOS image sensors allow for both analog and digital control circuits to be directly realized on a single integrated circuit (IC), making CMOS image sensors the most widely used type of image sensor.

SUMMARY

Exemplary embodiments of the present invention are directed to an image sensing device capable of interpolating pixel signals to be read out.

In accordance with an embodiment of the present invention, an image sensing device includes: a pixel array including a plurality of pixels arranged at each cross point of rows and columns, wherein the pixel array comprises a plurality of pixel blocks, each including N pixels, N being a natural number equal to or greater than 2, wherein the pixel blocks sequentially output a plurality of pixel signals having pixel information on the same color N times during one or more single row times; a plurality of column lines suitable for sequentially transferring the plurality of pixel signals from the pixel blocks, each column line being shared by two adjacent columns and coupled to at least one of the pixel blocks; a plurality of averaging blocks suitable for grouping the pixel signals to overlap each other, into a plurality of pixel signal groups, and averaging the pixel signal groups to output a plurality of averaged pixel signals, wherein the number of the averaging blocks is smaller than the number of the column lines; and a plurality of conversion blocks suitable for converting the averaged pixel signals into a plurality of digital signals.

Each of the pixel blocks may have a shared pixel structure.

The N pixels included each of the first to $X^{th}$ pixel blocks may be arranged in a predetermined color pattern.

The N pixels included each of odd-numbered pixel blocks among the first to $X^{th}$ pixel blocks may be arranged in a first color pattern, and the N pixels included each of even-numbered pixel blocks among the first to $X^{th}$ pixel blocks may be arranged in a second color pattern different from the first color pattern.

Each of the first to $Z^{th}$ averaging blocks may group the first to $X^{th}$ pixel signals by two pixel signals while sharing at least one of the two pixel signals with a neighboring averaging block, and averages the first to $Z^{th}$ pixel signal groups, where Z is equal to X−1.

Each of the first to $Z^{th}$ averaging blocks may sample the first to $X^{th}$ pixel signals to the first to $Z^{th}$ pixel signal groups, and averages the first to $Z^{th}$ pixel signal groups to generate the first to $Z^{th}$ averaged pixel signals.

In accordance with another embodiment of the present invention, an image sensing device includes: first to $X^{th}$ column lines, where X is a natural number equal to or greater than 2; odd-numbered pixel blocks, each including N pixels coupled to odd-numbered column lines among the first to $X^{th}$ column lines and suitable for sequentially outputting odd-numbered pixel signals having pixel information on the same color to the odd-numbered column lines N times in a first color order during a plurality of first single row times, where N is a natural number equal to or greater than 2; even-numbered pixel blocks, each including N pixels coupled to even-numbered column lines among the first to $X^{th}$ column lines and suitable for sequentially outputting even-numbered pixel signals having pixel information on the same color to the even-numbered column lines N times in a second color order during a plurality of second single row times; first to $Z^{th}$ averaging blocks suitable for grouping first to $X^{th}$ pixel signals outputted through the first to $X^{th}$ column lines to overlap each other into first to $Z^{th}$ pixel signal groups, and averaging the first to $Z^{th}$ pixel signal groups to output first to $Z^{th}$ averaged pixel signals, where Z is a natural number smaller than X; and first to $Z^{th}$ signal conversion blocks suitable for converting the first to $Z^{th}$ averaged pixel signals into first to $Z^{th}$ digital signals.

The odd-numbered pixel blocks and the even-numbered pixel blocks may be arranged in a zigzag shape on a row direction basis.

Each of the odd-numbered pixel blocks may include a plurality of first pixels arranged in a first color pattern, and each of the even-numbered pixel blocks includes a plurality of second pixels arranged in a second color pattern different from the first color pattern.

The first pixels and the second pixels may have a shared pixel structure.

At least one of the first pixels and at least one of the second pixels may be arranged in the same row.

The first single row times and the second single row times may include at least one third single row time.

The odd-numbered pixel blocks and the even-numbered pixel blocks may output the first to $X^{th}$ pixel signals having pixel information on the same color to the first to $X^{th}$ column lines during the third single row time.

Each of the first to $Z^{th}$ averaging blocks may group the first to $X^{th}$ pixel signals by two pixel signals while sharing at least one of the two pixel signals with a neighboring averaging block, and average the first to $Z^{th}$ pixel signal groups, where Z is equal to X−1.

Each of the first to $Z^{th}$ averaging blocks may sample the first to $X^{th}$ pixel signals to the first to $Z^{th}$ pixel signal groups, and average the first to $Z^{th}$ pixel signal groups to generate the first to $Z^{th}$ averaged pixel signals.

In accordance with another embodiment of the present invention, an image sensing device includes: first to $X^{th}$ column lines, where X is a natural number equal to or greater than 2; odd-numbered pixel blocks coupled to odd-numbered column lines among the first to $X^{th}$ column lines, and each including a shared pixel structure and N first pixels arranged in a first color pattern, where N is a natural number equal to or greater than 2; and even-numbered pixel blocks coupled to even-numbered column lines among the first to $X^{th}$ column lines, and each including the shared pixel structure and N second pixels arranged in a second color pattern.

The odd-numbered pixel blocks and the even-numbered pixel blocks may sequentially output first to $X^{th}$ pixel signals having pixel information on the same color to the first to $X^{th}$ column lines N times in a preset color order during one or more single row times.

The image sensing device may further include: first to $Z^{th}$ averaging blocks suitable for grouping the first to $X^{th}$ pixel signals to overlap each other into first to $Z^{th}$ pixel signal groups, and averaging the first to $Z^{th}$ pixel signal groups to output first to $Z^{th}$ averaged pixel signals, where Z is a natural number smaller than X; and first to $Z^{th}$ signal conversion blocks suitable for converting the first to $Z^{th}$ averaged pixel signals into first to $Z^{th}$ digital signals.

The odd-numbered pixel blocks may sequentially output odd-numbered pixel signals having pixel information on the same color to the odd-numbered column lines N times in a first color order during a plurality of first single row times, and the even-numbered pixel blocks may sequentially output even-numbered pixel signals having pixel information on the same color to the even-numbered column lines N times in a second color order during a plurality of second single row times.

The image sensing device may further include: first to $Z^{th}$ averaging blocks suitable for grouping the first to $X^{th}$ pixel signals outputted through the first to $X^{th}$ column lines to overlap each other into first to $Z^{th}$ pixel signal groups, and averaging the first to $Z^{th}$ pixel signal groups to output first to $Z^{th}$ averaged pixel signals, where Z is a natural number smaller than X; and first to $Z^{th}$ signal conversion blocks suitable for converting the first to $Z^{th}$ averaged pixel signals into first to $Z^{th}$ digital signals.

BRIEF DESCRIPTION OF THE DRAWINGS

The above and other features and advantages of the present invention will become more apparent to those skilled in the art to which the present invention belongs by describing in detail various embodiments thereof with reference to the attached drawings in which:

FIG. 4 is a diagram for additionally describing an operation of the image sensing device shown in FIG. 3.

FIG. 8 is a diagram for additionally describing an operation of the image sensing device shown in FIG. 7.

FIG. 12 is a diagram for additionally describing an operation of the image sensing device shown in FIG. 11.

DETAILED DESCRIPTION

Figure 1:
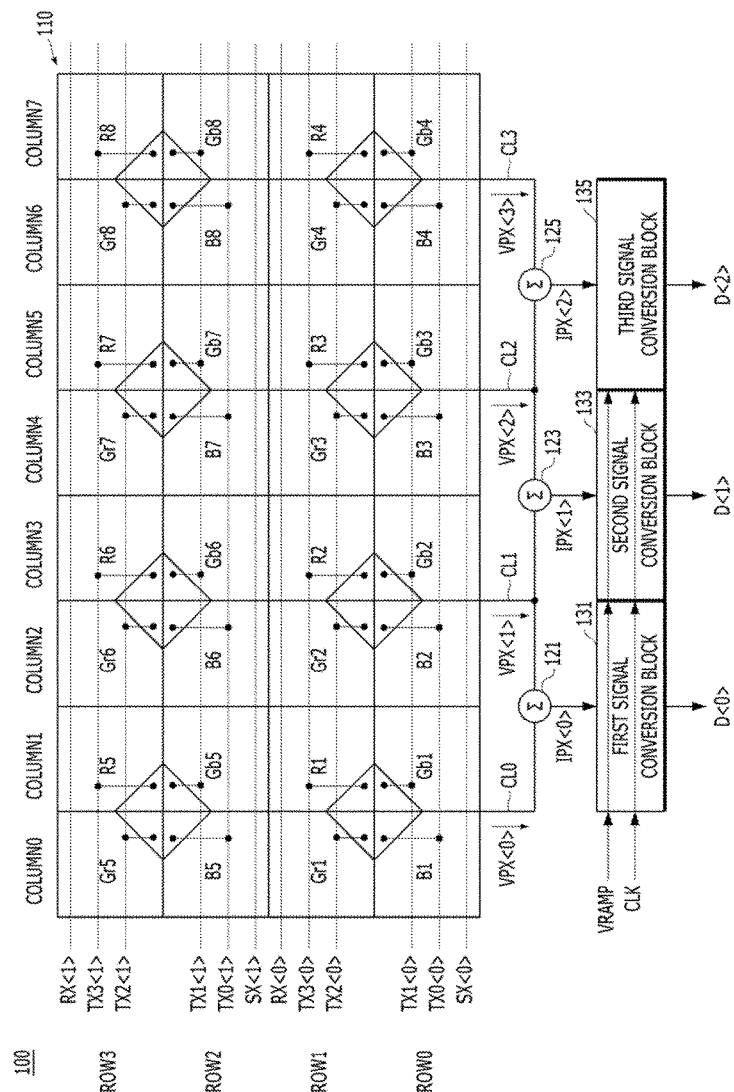
FIG. 1 is a block diagram illustrating an image sensing device, according to an embodiment of the present invention.

Exemplary embodiments of the present invention are described below in more detail with reference to the accompanying drawings. These embodiments are provided so that this disclosure is thorough and complete, and fully convey the present invention to those skilled in the art. All "embodiments" referred to in this disclosure refer to embodiments of the inventive concept disclosed herein. The embodiments presented are merely examples of the present invention and are not intended to limit the present invention.

The terminology used herein is for the purpose of describing particular embodiments only and is not intended to be limiting of the invent. As used herein, the singular forms "a", "an" and "the" are intended to include the plural forms as well, unless the context clearly indicates otherwise. It will be further understood that the terms "comprises," "includes," and variations thereof when used in this specification are non-limiting terms indicating the presence of any stated features, but do not preclude the presence or addition of one or more other features. As used herein, the term "and/or" indicates any and all combinations of one or more of the associated listed items.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

For the sake of convenience in description, a portion of the structure is just illustrated in the drawings, in accordance with embodiments of the present invention.

Moreover, the drawings are not drawn necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

Referring now to FIG. 1 an image sensing device 100 is provided, according to an embodiment of the present invention.

Referring to FIG. 1, the image sensing device 100 may include a pixel array 110, first to fourth column lines CL0, CL1, CL2 and CL3, first to third averaging blocks 121, 123 and 125, and first to third signal conversion blocks 131, 133 and 135.

The pixel array 110 may include a plurality of pixels arranged in first to fourth rows ROW0 to ROW3 and first to eighth columns COLUMN0 to COLUMN7. The pixels may be arranged in a 2*2 pixel color pattern. For example, the color pattern may include a Bayer pattern. In the Bayer pattern, a blue color pixel B# and a red color pixel R# may be arranged facing each other in a diagonal direction, and two green color pixels Gr# and Gb# may be arranged on the other corners.

Hereinafter, each of the 2*2 pixels arranged in the Bayer pattern is referred to as a pixel block. Hence, according to the embodiment illustrated in FIG. 1, each pixel block has four pixels, wherein each pixel is a color pixel. For example, four pixels B1, Gb1, Gr1 and R1 respectively arranged at each cross point of the first row ROW0, the second row ROW1, the first column COLUMN0 and the second column COLUMN1 are referred to as a first pixel block, four pixels B2, Gb2, Gr2 and R2 respectively arranged at each cross point of the first row ROW0, the second row ROW1, the third column COLUMN2 and the fourth column COLUMN3 are referred to as a second pixel block, four pixels B3, Gb3, Gr3 and R3 respectively arranged at each cross point of the first row ROW0, the second row ROW1, the fifth column COLUMN4 and the sixth column COLUMN5 are referred to as a third pixel block, and four pixels B4, Gb4, Gr4 and R4 respectively arranged at each cross point of the first row ROW0, the second row ROW1, the seventh column COLUMN6 and the eighth column COLUMN7 are referred to as a fourth pixel block. Further, four pixels B5, Gb5, Gr5 and R5 respectively arranged at each cross point of the third row ROW2, the fourth row ROW3, the first column COLUMN0 and the second column COLUMN1 are referred to as a fifth pixel block, four pixels B6, Gb6, Gr6 and R6 respectively arranged at each cross point of the third row ROW2, the fourth row ROW3, the third column COLUMN2 and the fourth column COLUMN3 are referred to as a sixth pixel block, four pixels B7, Gb7, Gr7 and R7 respectively arranged at each cross point of the third row ROW2, the fourth row ROW3, the fifth column COLUMN4 and the sixth column COLUMN5 are referred to as a seventh pixel block, and four pixels B8, Gb8, Gr8 and R8 respectively arranged at each cross point of the third row ROW2, the fourth row ROW3, the seventh column COLUMN6 and the eighth column COLUMN7 are referred to as an eighth pixel block. Each of the first to eighth pixel blocks may have a shared pixel structure. For example, the shared pixel structure may include a structure in which four photo diodes share a single floating diffusion node. Since the shared pixel structure is widely known to those skilled in the art, a detailed description thereon is omitted herein.

The first to fourth pixel blocks may sequentially output first to fourth pixel signals VPX<0:3> having pixel information on the same color to the first to fourth column lines CL0, CL1, CL2 and CL3 four times according to a preset color order during first and second single row times. For example, the first to fourth pixel blocks may output the first to fourth pixel signals VPX<0:3> corresponding to a green color Gb after outputting the first to fourth pixel signals VPX<0:3> corresponding to a blue color B during the first single row time assigned to the first row ROW0, and may output the first to fourth pixel signals VPX<0:3> corresponding to a red color R after outputting the first to fourth pixel signals VPX<0:3> corresponding to a green color Gr during the second single row time assigned to the second row ROW1, based on a first selection control signal SX<0>, a first reset control signal RX<0>, and a first transmission control signal group TX0<0>, TX1<0>, TX2<0> and TX3<0>. To be more specific, the first pixel block may output the first pixel signal VPX<0> corresponding to the green color Gb after outputting the first pixel signal VPX<0> corresponding to the blue color B during the first single row time based on the first selection control signal SX<0>, the first reset control signal RX<0> and first and second sub signals TX0<0> and TX1<0> of the first transmission control signal group TX0<0>, TX1<0>, TX2<0> and TX3<0>. The first pixel block may output the first pixel signal VPX<0> corresponding to the red color R, after outputting the first pixel signal VPX<0> corresponding to the green color Gr during the second single row time based on the first selection control signal SX<0>, the first reset control signal RX<0> and third and fourth sub signals TX2<0> and TX3<0> of the first transmission control signal group TX0<0>, TX1<0>, TX2<0> and TX3<0>.

The fifth to eighth pixel blocks may sequentially output first to fourth pixel signals VPX<0:3> having pixel information on the same color to the first to fourth column lines CL0, CL1, CL2 and CL3 four times according to a preset color order during third and fourth single row times. For example, the fifth to eighth pixel blocks may output the first to fourth pixel signals VPX<0:3> corresponding to the green color Gb after outputting the first to fourth pixel signals VPX<0:3> corresponding to the blue color B during the third single row time assigned to the third row ROW2, and may output the first to fourth pixel signals VPX<0:3> corresponding to the red color R, after outputting the first to fourth pixel signals VPX<0:3> corresponding to the green color Gr during the fourth single row time assigned to the fourth row ROW3, based on a second selection control signal SX<1>, a second reset control signal RX<1>, a second transmission control signal group TX0<1>, TX1<1>, TX2<1> and TX3<1>. To be specific, the fifth pixel block may output the first pixel signal VPX<0> corresponding to the green color Gb after outputting the first pixel signal VPX<0> corresponding to the blue color B during the third single row time based on the second selection control signal SX<1>, the second reset control signal RX<1> and first and second sub signals TX0<1> and TX1<1> of the second transmission control signal group TX0<1>, TX1<1>, TX2<1> and TX3<1>. The fifth pixel block may output the first pixel signal VPX<0> corresponding to the red color R, after outputting the first pixel signal VPX<0> corresponding to the green color Gr during the fourth single row time based on the second selection control signal SX<1>, the second reset control signal RX<1> and third and fourth sub signals TX2<1> and TX3<1> of the second transmission control signal group TX0<1>, TX1<1>, TX2<1> and TX3<1>.

The first to fourth column lines CL0, CL1, CL2 and CL3 may be coupled to the first to eighth pixel blocks. As illustrated in the embodiment of FIG. 1 each of the first to fourth column lines CL0, CL1, CL2 and CL3 may be shared by two adjacent columns and coupled to at least two of the pixel blocks. However, the invention is not limited to this configuration. For example, in another embodiment, each of the first to fourth column lines CL0, CL1, CL2 and CL3 may be shared by two adjacent columns and coupled to at least one of the pixel blocks.

Referring now to the embodiment illustrated in FIG. 1, the number of the first to third averaging blocks 121, 123 and 125, or the number of the first to third signal conversion blocks 131, 133 and 135 may be smaller than the number of the first to fourth column lines CL0, CL1, CL2 and CL3. For example, the first column line CL0 may be coupled to the first and fifth pixel blocks in common, and the second column line CL1 may be coupled to the second and sixth pixel blocks in common, and the third column line CL2 may be coupled to the third and seventh pixel blocks in common, and the fourth column line CL3 may be coupled to the fourth and eighth pixel blocks in common. The first column line CL0 may transmit the first pixel signal VPX<0> to the first averaging block 121, and the second column line CL1 may transmit the second pixel signal VPX<1> to the first and second averaging blocks 121 and 123, and the third column line CL2 may transmit the third pixel signal VPX<2> to the second and third averaging blocks 123 and 125, and the fourth column line CL3 may transmit the fourth pixel signal VPX<3> to the third averaging block 125.

The first to third averaging blocks 121, 123 and 125 may group to overlap the first to fourth pixel signals VPX<0:3> in first to third pixel signal groups, and may average the first to third pixel signal groups to generate first to third averaged pixel signals IPX<0:2>. For example, the first to third averaging blocks 121, 123 and 125 may group the first to fourth pixel signals VPX<0:3> by grouping two pixel signals while sharing at least one of two pixel signals with neighboring averaging block. Hence, the first averaging block 121 may group the first and second pixel signals VPX<0:1> as the first pixel signal group and may average the first pixel signal group to generate the first averaged pixel signal IPX<0>. The second averaging block 123 may group the second and third pixel signals VPX<1:2> as the second pixel signal group and may average the second pixel signal group to generate the second averaged pixel signal IPX<1>, and the third averaging block 125 may group the third and fourth pixel signals VPX<2:3> as the third pixel signal group and may average the third pixel signal group to generate the third averaged pixel signal IPX<2>.

The first to third signal conversion blocks 131, 133 and 135 may convert the first to third averaged pixel signals IPX<0:2> into first to third digital signals D<0:2>. For example, the first to third signal conversion blocks 131, 133 and 135 may detect voltage levels of the first to third averaged pixel signals IPX<0:2> based on a common ramp signal VRAMP and may generate the first to third digital signals D<0:2> corresponding to the detection result.

Figure 2:
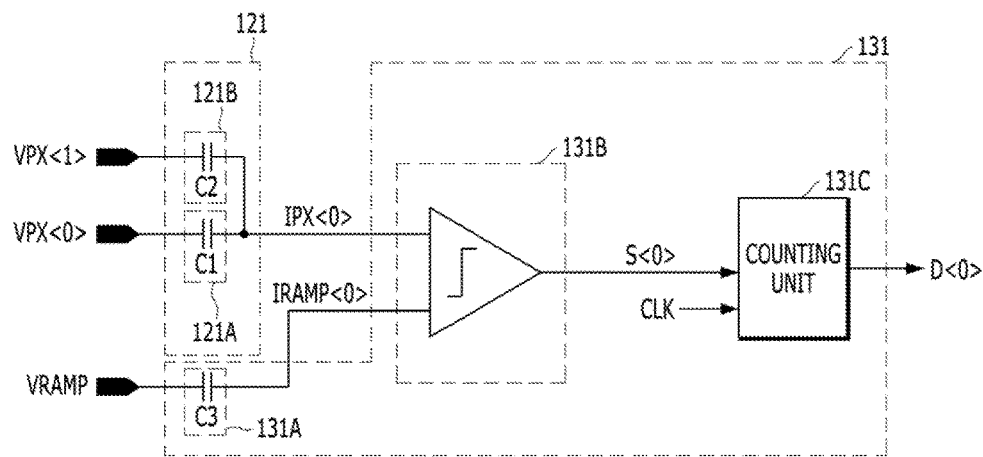
FIG. 2 is a circuit diagram illustrating an example of a first averaging block and a first signal conversion block shown in FIG. 1.

FIG. 2 is a circuit diagram illustrating the first averaging block 121 and the first signal conversion block 131 shown in FIG. 1.

Referring to FIG. 2, the first averaging block 121 may sample the first pixel signal VPX<0> and the second pixel signal VPX<1> as the first pixel signal group and average the first pixel signal group to generate the first averaged pixel signal IPX<0>. For example, the first averaging block 121 may include first and second sampling units 121A and 121B coupled to an output node of the first averaged pixel signal IPX<0> in parallel. The first sampling unit 121A may sample the first pixel signal VPX<0> as the first pixel signal group, and the second sampling unit 121B may sample the second pixel signal VPX<1> as the first pixel signal group. For example, the first sampling unit 121A may include a first capacitor C1, and the second sampling unit 121B may include a second capacitor C2. Each of the first and second capacitors C1 and C2 may have capacitance Cs/2 corresponding to one half of the capacitance Cs of a third capacitor C3 included in the first signal conversion block 131. The first to third capacitors C1, C2, and C3 may have a structure corresponding to a correlated double sampling (CDS) circuit.

The first signal conversion block 131 may include a third sampling unit 131A, a comparison unit 131B and a counting unit 131C. The third sampling unit 131A may sample the common ramp signal VRAMP to generate a first ramp signal IRAMP<0>. For example, the third sampling unit 131A may include the third capacitor C3. Although it is described in the embodiments of the present invention that the third sampling unit 131A includes the third capacitor C3, the inventive concept is not limited to this. The third sampling unit 131A may include the third capacitor C3 and a fourth capacitor C4 (not shown) coupled to an output node of the first ramp signal IRAMP<0> in parallel, each of which corresponds to the first and second capacitors C1 and C2. In this case, each of the third and fourth capacitors C3 and C4 may sample the common ramp signal VRAMP and may average the sampled common ramp signals to generate the first ramp signal IRAMP<0>. The first to fourth capacitors C1 to C4 may have the same capacitance Cs/2.

The comparison unit 131B may compare the first averaged pixel signal IPX<0> with the first ramp signal IRAMP<0> and may generate a first comparison signal S<0> corresponding to the comparison result. The counting unit 131C may count a clock CLK based on the first comparison signal S<0> and may generate the first digital signal D<0> corresponding to the counting result. Since the comparison unit 131B and the counting unit 131C are widely known to those skilled in the art, detailed descriptions thereon are omitted herein.

Since the second and third averaging blocks 123 and 125 may have the same structure as the first averaging block 121, and the second and third signal conversion blocks 133 and 135 may have the same structure as the first signal conversion block 131, detailed descriptions thereon are omitted herein.

Hereinafter, an operation of the image sensing device 100 having the aforementioned structure according to an embodiment of the present invention is described below with reference to FIGS. 3 and 4.

Figure 3:
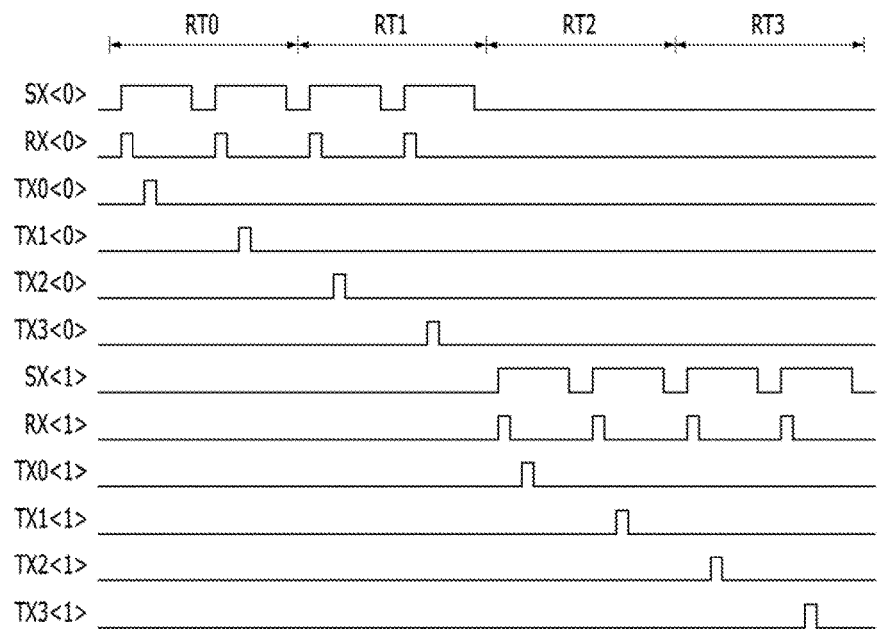
FIG. 3 is a timing diagram illustrating an operation of the image sensing device shown in FIG. 1.

FIG. 3 is a timing diagram illustrating a readout method of the image sensing device 100 shown in FIG. 1. FIG. 4 is a diagram for additionally describing the readout method of the image sensing device 100 shown in FIG. 3.

Referring to FIG. 3, the pixel array 110 may output the first to fourth pixel signals VPX<0:3> to the first to fourth column lines CL0, CL1, CL2 and CL3 by row during first to fourth single row times RT0, RT1, RT2 and RT3 respectively assigned to the first to fourth rows ROW0, ROW1, ROW2 and ROW3.

For example, the first to fourth pixel blocks may output the first to fourth pixel signals VPX<0:3> corresponding to the pixels Gb1, Gb2, Gb3 and Gb4 in the green color Gb arranged in the first row ROW0 to the first to fourth column lines CL0, CL1, CL2 and CL3 after outputting the first to fourth pixel signals VPX<0:3> corresponding to the pixels B1, B2, B3 and B4 in the blue color B arranged in the first row ROW0 to the first to fourth column lines CL0, CL1, CL2 and CL3 during the first single row time RT0 based on the first selection control signal SX<0>, the first reset control signal RX<0> and the first and second sub signals TX0<0> and TX1<0> of the first transmission control signal group TX0<0>, TX1<0>, TX2<0> and TX3<0>. In addition, the first to fourth pixel blocks may output the first to fourth pixel signals VPX<0:3> corresponding to the pixels R1, R2, R3 and R4 in the red color R arranged in the second row ROW1 to the first to fourth column lines CL0, CL1, CL2 and CL3 after outputting the first to fourth pixel signals VPX<0:3> corresponding to the pixels Gr1, Gr2, Gr3 and Gr4 in the green color Gr arranged in the second row ROW1 to the first to fourth column lines CL0, CL1, CL2 and CL3 during the second single row time RT1 based on the first selection control signal SX<0>, the first reset control signal RX<0> and the third and fourth sub signals TX2<0> and TX3<0> of the first transmission control signal group TX0<0>, TX1<0>, TX2<0> and TX3<0>.

The fifth to eighth pixel blocks may output the first to fourth pixel signals VPX<0:3> corresponding to the pixels Gb5, Gb6, Gb7 and Gb8 in the green color Gb arranged in the third row ROW2 to the first to fourth column lines CL0, CL1, CL2 and CL3 after outputting the first to fourth pixel signals VPX<0:3> corresponding to the pixels B5, B6, B7 and B8 in the blue color B arranged in the third row ROW2 to the first to fourth column lines CL0, CL1, CL2 and CL3 during the third single row time RT2 based on the second selection control signal SX<1>, the second reset control signal RX<1> and the first and second sub signals TX0<1> and TX1<1> of the second transmission control signal group TX0<1>, TX1<1>, TX2<1> and TX3<1>. In addition, the fifth to eighth pixel blocks may output the first to fourth pixel signals VPX<0:3> corresponding to the pixels R5, R6, R7 and R8 in the red color R arranged in the fourth row ROW3 to the first to fourth column lines CL0, CL1, CL2 and CL3 after outputting the first to fourth pixel signals VPX<0:3> corresponding to the pixels Gr5, Gr6, Gr7 and Gr8 in the green color Gr arranged in the fourth row ROW3 to the first to fourth column lines CL0, CL1, CL2 and CL3 during the fourth single row time RT3 based on the second selection control signal SX<1>, the second reset control signal RX<1> and the third and fourth sub signals TX2<0> and TX3<0> of the first transmission control signal group TX0<0>, TX1<0>, TX2<0> and TX3<0>.

The first averaging block 121 may average the first and second pixel signals VPX<0:1> having pixel information on the same color and may generate the first averaged pixel signal IPX<0> by row during the first to fourth single row times RT0, RT1, RT2 and RT3. The second averaging block 123 may average the second and third pixel signals VPX<1:2> having pixel information on the same color and may generate the second averaged pixel signal IPX<1> by row during the first to fourth single row times RT0, RT1, RT2 and RT3. The third averaging block 125 may average the third and fourth pixel signals VPX<2:3> having pixel information on the same color and may generate the third averaged pixel signal IPX<2> by row during the first to fourth single row times RT0, RT1, RT2 and RT3. For example, the first averaging block 121 may sample the first and second pixel signals VPX<0:1> as the first pixel signal group, and may average the first pixel signal group to generate the first averaged pixel signal IPX<0>. The second averaging block 123 may sample the second and third pixel signals VPX<1:2> as the second pixel signal group, and may average the second pixel signal group to generate the second averaged pixel signal IPX<1>. The third averaging block 125 may sample the third and fourth pixel signals VPX<2:3> as the third pixel signal group, and may average the third pixel signal group to generate the third averaged pixel signal IPX<2>.

The first to third signal conversion blocks 131, 133 and 135 may generate the first to third digital signals D<0:2> by row based on the common ramp signal VRAMP and the first to third averaged pixel signals IPX<0:2>. As shown in FIG. 4, the first to third digital signals D<0:2> generated by row may correspond to result data B12, . . . , and R78 obtained by interpolating the pixel signals having pixel information on the same color.

Hence, an embodiment of the present invention provides improved signal-to-noise ratio (SNR) as a plurality of pixel signals read out from a plurality of pixel blocks are interpolated to overlap the pixel signals which have pixel information on the same color without a resolution deterioration.

Figure 5:
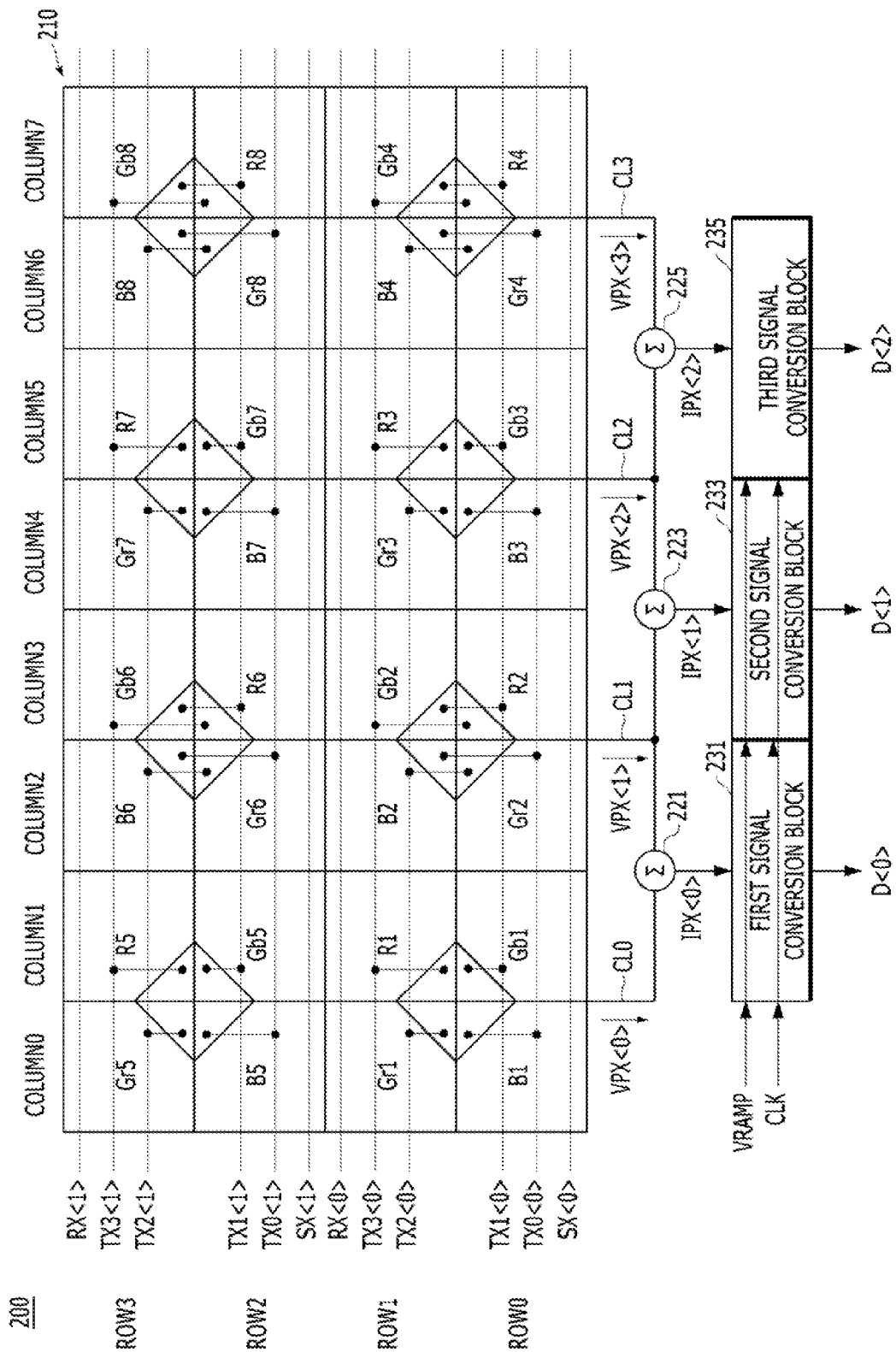
FIG. 5 is a block diagram illustrating an image sensing device, according to an embodiment of the present invention.

FIG. 5 is a block diagram illustrating an image sensing device 200, according to another embodiment of the present invention.

Referring to FIG. 5, the image sensing device 200 may include a pixel array 210, first to fourth column lines CL0, CL1, CL2 and CL3, first to third averaging blocks 221, 223 and 225, and first to third signal conversion blocks 231, 233 and 235.

The pixel array 210 may include a plurality of pixels arranged in first to fourth rows ROW0 to ROW3 and first to eighth columns COLUMN0 to COLUMN7. Herein each pixel block of 2*2 pixels has four pixels. For example, four pixels B1, Gb1, Gr1 and R1 respectively arranged at each cross point of the first row ROW0, the second row ROW1, the first column COLUMN0 and the second column COLUMN1 are referred to as a first pixel block, four pixels Gr2, R2, B2 and Gb2 respectively arranged at each cross point of the first row ROW0, the second row ROW1, the third column COLUMN2 and the fourth column COLUMN3 are referred to as a second pixel block, four pixels B3, Gb3, Gr3 and R3 respectively arranged at each cross point of the first row ROW0, the second row ROW1, the fifth column COLUMN4 and the sixth column COLUMN5 are referred to as a third pixel block, and four pixels Gr4, R4, B4 and Gb4 respectively arranged at each cross point of the first row ROW0, the second row ROW1, the seventh column COLUMN6 and the eighth column COLUMN7 are referred to as a fourth pixel block. Further, four pixels B5, Gb5, Gr5 and R5 respectively arranged at each cross point of the third row ROW2, the fourth row ROW3, the first column COLUMN0 and the second column COLUMN1 are referred to as a fifth pixel block, four pixels Gr6, R6, B6 and Gb6 respectively arranged at each cross point of the third row ROW2, the fourth row ROW3, the third column COLUMN2 and the fourth column COLUMN3 are referred to as a sixth pixel block, four pixels B7, Gb7, Gr7 and R7 respectively arranged at each cross point of the third row ROW2, the fourth row ROW3, the fifth column COLUMN4 and the sixth column COLUMN5 are referred to as a seventh pixel block, and four pixels Gr8, R8, B8 and Gb8 respectively arranged at each cross point of the third row ROW2, the fourth row ROW3, the seventh column COLUMN6 and the eighth column COLUMN7 are referred to as an eighth pixel block. Each of the first to eighth pixel blocks may have a shared pixel structure. For example, the shared pixel structure may include a structure in which four photo diodes share a single floating diffusion node. Since the shared pixel structure is widely known to those skilled in the art, a detailed description thereon is omitted herein.

The odd-numbered pixel bocks on a column basis among the first to eighth pixel blocks, i.e., the first pixel block, the third pixel block, the fifth pixel block and the seventh pixel block, may be arranged in a first color pattern. For example, the first color pattern may include a Bayer pattern. In the Bayer pattern, a blue color pixel B# and a red color pixel R# may be arranged to face each other in a diagonal direction, and two green color pixels Gr# and Gb# may be arranged on the other corners. On the other hand, the even-numbered pixel blocks on a column basis among the first to eighth pixel blocks, i.e., the second pixel block, the fourth pixel block, the sixth pixel block and the eighth pixel block, may be arranged in a second color pattern. For example, in the second color pattern, a blue color pixel B#, a red color pixel R# and two green color pixels Gr# and Gb# may be arranged not to overlap the color pixels of the Bayer pattern.

The first to fourth pixel blocks may sequentially output first to fourth pixel signals VPX<0:3> having pixel information on the same color to the first to fourth column lines CL0, CL1, CL2 and CL3 four times according a preset color order during first and second single row times. For example, the first to fourth pixel blocks may output the first to fourth pixel signals VPX<0:3> corresponding to a green color Gb after outputting the first to fourth pixel signals VPX<0:3> corresponding to a blue color B during the first single row time assigned to the first row ROW0, and may output the first to fourth pixel signals VPX<0:3> corresponding to a red color R, after outputting the first to fourth pixel signals VPX<0:3> corresponding to a green color Gr during the second single row time assigned to the second row ROW1, based on a first selection control signal SX<0>, a first reset control signal RX<0>, and a first transmission control signal group TX0<0>, TX1<0>, TX2<0> and TX3<0>. To be more specific, the first pixel block may output the first pixel signal VPX<0> corresponding to the green color Gb after outputting the first pixel signal VPX<0> corresponding to the blue color B during the first single row time based on the first selection control signal SX<0>, the first reset control signal RX<0> and first and second sub signals TX0<0> and TX1<0> of the first transmission control signal group TX0<0>, TX1<0>, TX2<0> and TX3<0>. The first pixel block may output the first pixel signal VPX<0> corresponding to the red color R, after outputting the first pixel signal VPX<0> corresponding to the green color Gr during the second single row time based on the first selection control signal SX<0>, the first reset control signal RX<0> and third and fourth sub signals TX2<0> and TX3<0> of the first transmission control signal group TX0<0>, TX1<0>, TX2<0> and TX3<0>.

The fifth to eighth pixel blocks may sequentially output first to fourth pixel signals VPX<0:3> having pixel information on the same color to the first to fourth column lines CL0, CL1, CL2 and CL3 four times according to a preset color order during third and fourth single row times. For example, the fifth to eighth pixel blocks may output the first to fourth pixel signals VPX<0:3> corresponding to the green color Gb after outputting the first to fourth pixel signals VPX<0:3> corresponding to the blue color B during the third single row time assigned to the third row ROW2, and may output the first to fourth pixel signals VPX<0:3> corresponding to the red color R, after outputting the first to fourth pixel signals VPX<0:3> corresponding to the green color Gr during the fourth single row time assigned to the fourth row ROW3, based on a second selection control signal SX<1>, a second reset control signal RX<1> and a second transmission control signal group TX0<1>, TX1<1>, TX2<1> and TX3<1>. To be specific, the fifth pixel block may output the first pixel signal VPX<0> corresponding to the green color Gb after outputting the first pixel signal VPX<0> corresponding to the blue color B during the third single row time based on the second selection control signal SX<1>, the second reset control signal RX<1> and first and second sub signals TX0<1> and TX1<1> of the second transmission control signal group TX0<1>, TX1<1>, TX2<1> and TX3<1>. The fifth pixel block may output the first pixel signal VPX<0> corresponding to the red color R, after outputting the first pixel signal VPX<0> corresponding to the green color Gr during the fourth single row time based on the second selection control signal SX<1>, the second reset control signal RX<1> and third and fourth sub signals TX2<1> and TX3<1> of the second transmission control signal group TX0<1>, TX1<1>, TX2<1> and TX3<1>.

The first to fourth column lines CL0, CL1, CL2 and CL3 may be coupled to the first to eighth pixel blocks. For example, the first column line CL0 may be coupled to the first and fifth pixel blocks in common, the second column line CL1 may be coupled to the second and sixth pixel blocks in common, the third column line CL2 may be coupled to the third and seventh pixel blocks in common, and the fourth column line CL3 may be coupled to the fourth and eighth pixel blocks in common. The first column line CL0 may transmit the first pixel signal VPX<0> to the first averaging block 221, the second column line CL1 may transmit the second pixel signal VPX<1> to the first and second averaging blocks 221 and 223, the third column line CL2 may transmit the third pixel signal VPX<2> to the second and third averaging blocks 223 and 225, and the fourth column line CL3 may transmit the fourth pixel signal VPX<3> to the third averaging block 225.

The first to third averaging blocks 221, 223 and 225 may group the first to fourth pixel signals VPX<0:3> into first to third pixel signal groups, and may average the first to third pixel signal groups to generate first to third averaged pixel signals IPX<0:2>. For example, the first to third averaging blocks 221, 223 and 225 may group the first to fourth pixel signals VPX<0:3> by two pixel signals while sharing at least one of two pixel signals with a neighboring averaging block. In this case, the first averaging block 221 may group the first and second pixel signals VPX<0:1> as the first pixel signal group and may average the first pixel signal group to generate the first averaged pixel signal IPX<0>. The second averaging block 223 may group the second and third pixel signals VPX<1:2> as the second pixel signal group and may average the second pixel signal group to generate the second averaged pixel signal IPX<1>, and the third averaging block 225 may group the third and fourth pixel signals VPX<2:3> as the third pixel signal group and may average the third pixel signal group to generate the third averaged pixel signal IPX<2>.

The first to third signal conversion blocks 231, 233 and 235 may convert the first to third averaged pixel signals IPX<0:2> into first to third digital signals D<0:2>. For example, the first to third signal conversion blocks 231, 233 and 235 may detect voltage levels of the first to third averaged pixel signals IPX<0:2> based on a common ramp signal VRAMP and may generate the first to third digital signals D<0:2> corresponding to the detection result.

Figure 6:
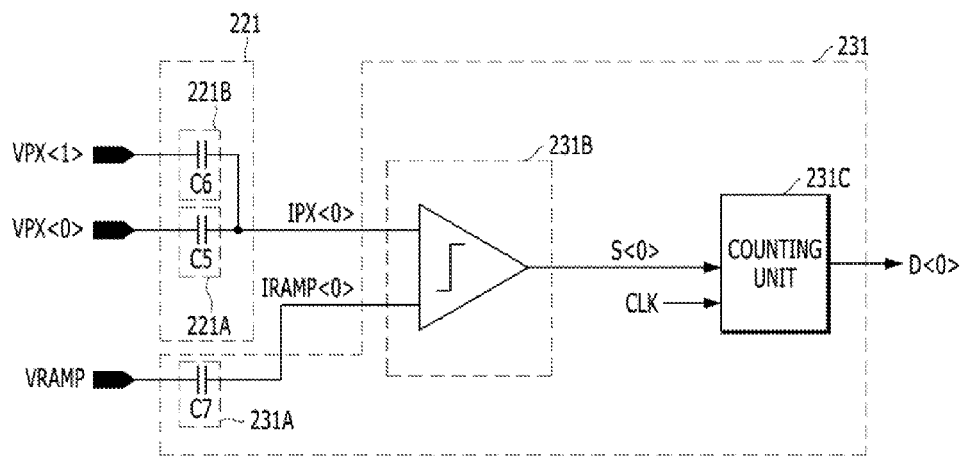
FIG. 6 is a circuit diagram illustrating an example of a first averaging block and a first signal conversion block shown in FIG. 5.

FIG. 6 is a circuit diagram illustrating the first averaging block 221 and the first signal conversion block 231 shown in FIG. 5.

Referring to FIG. 6, the first averaging block 221 may sample the first pixel signal VPX<0> and the second pixel signal VPX<1> as the first pixel signal group and average the first pixel signal group to generate the first averaged pixel signal IPX<0>. For example, the first averaging block 221 may include first and second sampling units 221A and 221B coupled to an output node of the first averaged pixel signal IPX<0> in parallel. The first sampling unit 221A may sample the first pixel signal VPX<0>, and the second sampling unit 221B may sample the second pixel signal VPX<1>. For example, the first sampling unit 221A may include a first capacitor C5, and the second sampling unit 221B may include a second capacitor C6. Each of the first and second capacitors C5 and C6 may have a capacitance Cs/2 corresponding to one half of capacitance Cs of a third capacitor C7 included in the first signal conversion block 231. The first to third capacitors C5, C6, and C7 may have a structure corresponding to a correlated double sampling (CDS) circuit.

The first signal conversion block 231 may include a third sampling unit 231A, a comparison unit 231B and a counting unit 231C. The third sampling unit 231A may sample the common ramp signal VRAMP to generate a first ramp signal IRAMP<0>. For example, the third sampling unit 231A may include the third capacitor C7. Although it is described in the embodiments of the present invention that the third sampling unit 231A includes the third capacitor C7, the inventive concept is not limited to this. For, example, in another embodiment, the third sampling unit 231A may include the third capacitor C7 and a fourth capacitor C8 (not shown) coupled to an output node of the first ramp signal IRAMP<0> in parallel, each of which corresponds to the first and second capacitors C5 and C6. In this case, each of the third and fourth capacitors C7 and C8 may sample the common ramp signal VRAMP and may average the sampled common ramp signals to generate the first ramp signal IRAMP<0>. The first to fourth capacitors C5 to C8 may have the same capacitance Cs/2. The comparison unit 231B may compare the first averaged pixel signal IPX<0> with the first ramp signal IRAMP<0> and may generate a first comparison signal S<0> corresponding to the comparison result. The counting unit 231C may count a clock CLK based on the first comparison signal S<0> and may generate the first digital signal D<0> corresponding to the counting result. Since the comparison unit 231B and the counting unit 231C are widely known to those skilled in the art, detailed descriptions thereon are omitted herein.

Since the second and third averaging blocks 223 and 225 may have the same structure as the first averaging block 221, and the second and third signal conversion blocks 233 and 235 may have the same structure as the first signal conversion block 231, detailed descriptions thereon are omitted herein.

Hereinafter, an operation of the image sensing device 200 having the aforementioned structure is described below with reference to FIGS. 7 and 8, according to an embodiment of the present invention.

Figure 7:
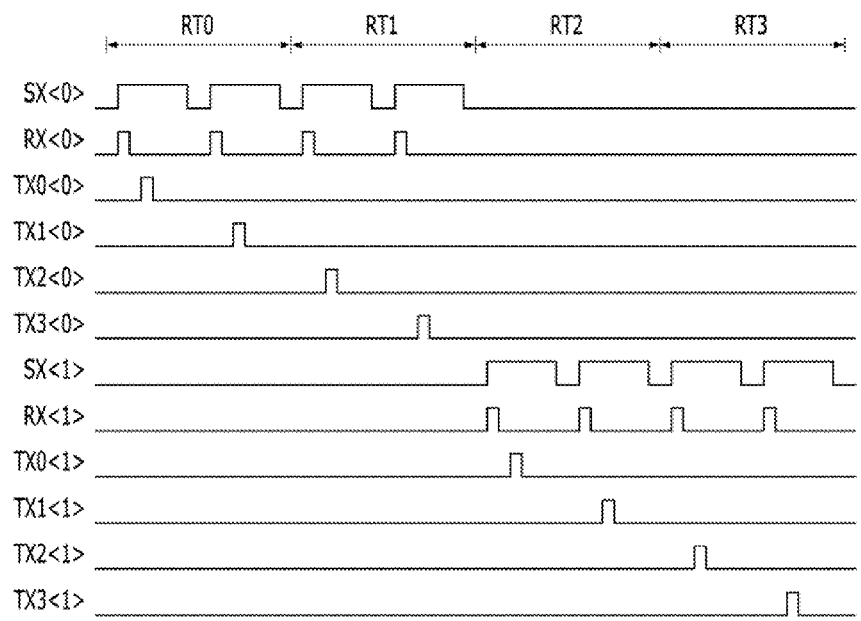
FIG. 7 is a timing diagram illustrating an operation of the image sensing device shown in FIG. 5.

FIG. 7 is a timing diagram illustrating a readout method of the image sensing device 200 shown in FIG. 5. FIG. 8 is a diagram for additionally describing the readout method of the image sensing device 200 shown in FIG. 7.

Referring to FIG. 7, the pixel array 210 may output the first to fourth pixel signals VPX<0:3> to the first to fourth column lines CL0, CL1, CL2 and CL3 by row during first to fourth single row times RT0, RT1, RT2 and RT3 respectively assigned to the first to fourth rows ROW0, ROW1, ROW2 and ROW3.

For example, the first to fourth pixel blocks may output the first to fourth pixel signals VPX<0:3> corresponding to the pixels Gb1, Gb2, Gb3 and Gb4 in the green color Gb arranged in the first row ROW0 or the second row ROW1 to the first to fourth column lines CL0, CL1, CL2 and CL3 after outputting the first to fourth pixel signals VPX<0:3> corresponding to the pixels B1, B2, B3 and B4 in the blue color B arranged in the first row ROW0 or the second row ROW1 to the first to fourth column lines CL0, CL1, CL2 and CL3 during the first single row time RT0 based on the first selection control signal SX<0>, the first reset control signal RX<0> and the first and second sub signals TX0<0> and TX1<0> of the first transmission control signal group TX0<0>, TX1<0>, TX2<0> and TX3<0>. In addition, the first to fourth pixel blocks may output the first to fourth pixel signals VPX<0:3> corresponding to the pixels R1, R2, R3 and R4 in the red color R arranged in the first row ROW0 or the second row ROW1 to the first to fourth column lines CL0, CL1, CL2 and CL3 after outputting the first to fourth pixel signals VPX<0:3> corresponding to the pixels Gr1, Gr2, Gr3 and Gr4 in the green color Gr arranged in the first row ROW0 or the second row ROW1 to the first to fourth column lines CL0, CL1, CL2 and CL3 during the second single row time RT1 based on the first selection control signal SX<0>, the first reset control signal RX<0> and the third and fourth sub signals TX2<0> and TX3<0> of the first transmission control signal group TX0<0>, TX1<0>, TX2<0> and TX3<0>.

The fifth to eighth pixel blocks may output the first to fourth pixel signals VPX<0:3> corresponding to the pixels Gb5, Gb6, Gb7 and Gb8 in the green color Gb arranged in the third row ROW2 or the fourth row ROW3 to the first to fourth column lines CL0, CL1, CL2 and CL3 after outputting the first to fourth pixel signals VPX<0:3> corresponding to the pixels B5, B6, B7 and B8 in the blue color B arranged in the third row ROW2 or the fourth row ROW3 to the first to fourth column lines CL0, CL1, CL2 and CL3 during the third single row time RT2 based on the second selection control signal SX<1>, the second reset control signal RX<1> and the first and second sub signals TX0<1> and TX1<1> of the second transmission control signal group TX0<1>, TX1<1>, TX2<1> and TX3<1>. In addition, the fifth to eighth pixel blocks may output the first to fourth pixel signals VPX<0:3> corresponding to the pixels R5, R6, R7 and R8 in the red color R arranged in the third row ROW2 or the fourth row ROW3 to the first to fourth column lines CL0, CL1, CL2 and CL3 after outputting the first to fourth pixel signals VPX<0:3> corresponding to the pixels Gr5, Gr6, Gr7 and Gr8 in the green color Gr arranged in the third row ROW2 or the fourth row ROW3 to the first to fourth column lines CL0, CL1, CL2 and CL3 during the fourth single row time RT3 based on the second selection control signal SX<1>, the second reset control signal RX<1> and the third and fourth sub signals TX2<0> and TX3<0> of the first transmission control signal group TX0<0>, TX1<0>, TX2<0> and TX3<0>.

The first averaging block 221 may average the first and second pixel signals VPX<0:1> having pixel information on the same color and may generate the first averaged pixel signal IPX<0> by row during the first to fourth single row times RT0, RT1, RT2 and RT3. The second averaging block 223 may average the second and third pixel signals VPX<1:2> having pixel information on the same color and may generate the second averaged pixel signal IPX<1> by row during the first to fourth single row times RT0, RT1, RT2 and RT3. The third averaging block 225 may average the third and fourth pixel signals VPX<2:3> having pixel information on the same color and may generate the third averaged pixel signal IPX<2> by row during the first to fourth single row times RT0, RT1, RT2 and RT3. For example, the first averaging block 221 may sample the first and second pixel signals VPX<0:1> as the first pixel signal group, and may average the first pixel signal group to generate the first averaged pixel signal IPX<0>. The second averaging block 223 may sample the second and third pixel signals VPX<1:2> as the second pixel signal group, and may average the second pixel signal group to generate the second averaged pixel signal IPX<1>. The third averaging block 225 may sample the third and fourth pixel signals VPX<2:

3> as the third pixel signal group, and may average the third pixel signal group to generate the third averaged pixel signal IPX<2>.

The first to third signal conversion blocks 231, 233 and 235 may generate the first to third digital signals D<0:2> based on the common ramp signal VRAMP and the first to third averaged pixel signals IPX<0:2>. As shown in FIG. 8, the first to third digital signals D<0:2> may correspond to result data B12, . . . , and R78 obtained by interpolating the pixel signals having pixel information on the same color.

Hence, the embodiment of the present invention of FIG. 5, also provides the advantages of the first embodiment, and in addition also provides an additional advantage in that fixed pattern noise (FPN) may be reduced as a color disposition of some pixel blocks is changed.

Figure 9:
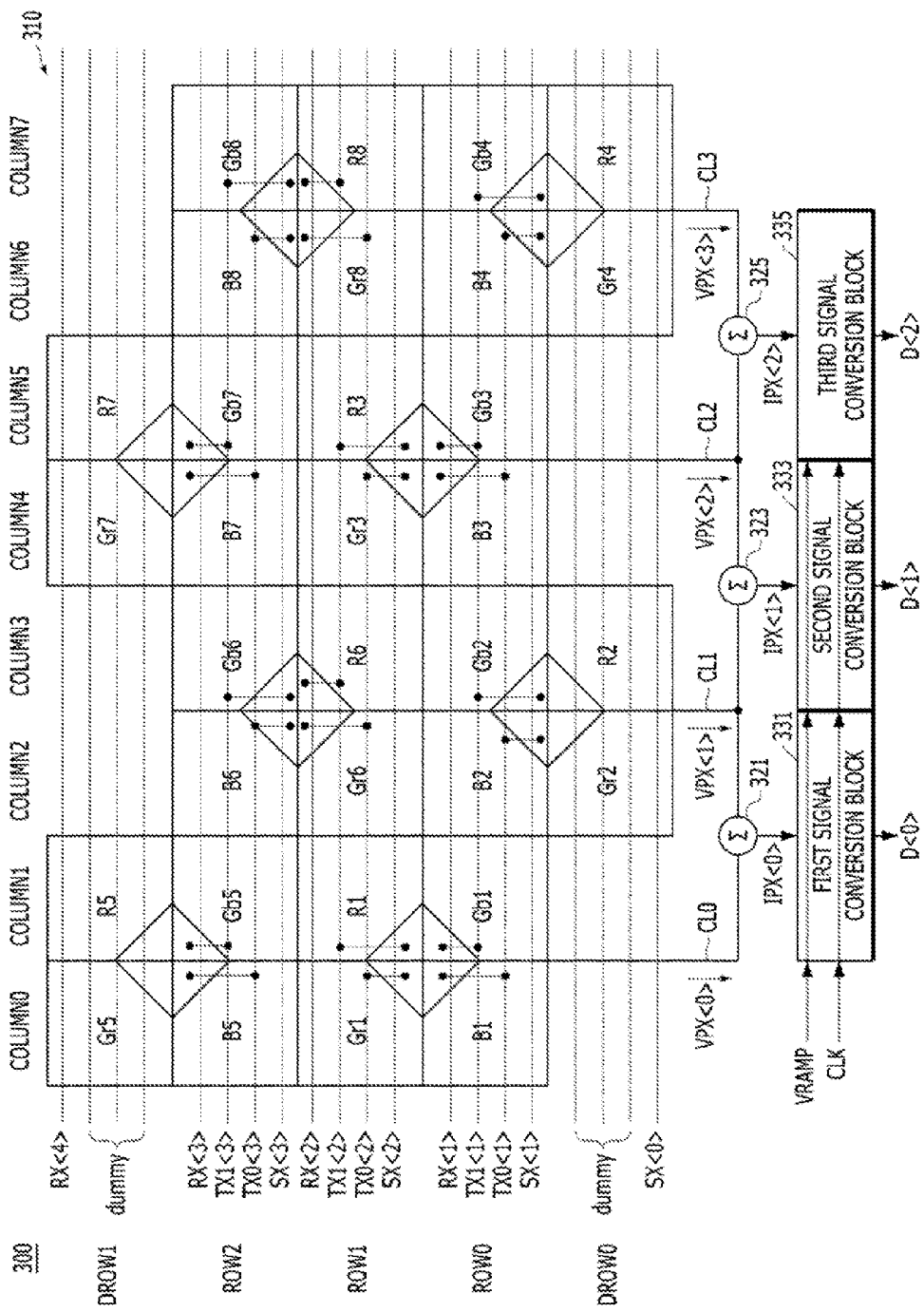
FIG. 9 is a block diagram illustrating an image sensing device, according to an embodiment of the present invention.

FIG. 9 is a block diagram illustrating an image sensing device 300, according to yet an embodiment of the present invention.

Referring to FIG. 9, the image sensing device 300 may include a pixel array 310, first to fourth column lines CL0, CL1, CL2 and CL3, first to third averaging blocks 321, 323 and 325, and first to third signal conversion blocks 331, 333 and 335.

The pixel array 310 may include a plurality of pixels arranged in first and second dummy rows DROW0 and DROW1, first to third rows ROW0 to ROW2 and first to eighth columns COLUMN0 to COLUMN7. Each pixel block of 2*2 pixels includes four pixels. For example, four pixels B1, Gb1, Gr1 and R1 respectively arranged at each cross point of the first row ROW0, the second row ROW1, the first column COLUMN0 and the second column COLUMN1 are referred to as a first pixel block, four pixels Gr2, R2, B2 and Gb2 respectively arranged at each cross point of the first dummy row DROW0, the first row ROW0, the third column COLUMN2 and the fourth column COLUMN3 are referred to as a second pixel block, four pixels B3, Gb3, Gr3 and R3 respectively arranged at each cross point of the first row ROW0, the second row ROW1, the fifth column COLUMN4 and the sixth column COLUMN5 are referred to as a third pixel block, and four pixels Gr4, R4, B4 and Gb4 respectively arranged at each cross point of the first dummy row DROW0, the first row ROW0, the seventh column COLUMN6 and the eighth column COLUMN7 are referred to as a fourth pixel block. Further, four pixels B5, Gb5, Gr5 and R5 respectively arranged at each cross point of the third row ROW2, the second dummy row DROW1, the first column COLUMN0 and the second column COLUMN1 are referred to as a fifth pixel block, four pixels Gr6, R6, B6 and Gb6 respectively arranged at each cross point of the second row ROW1, the third row ROW2, the third column COLUMN2 and the fourth column COLUMN3 are referred to as a sixth pixel block, four pixels B7, Gb7, Gr7 and R7 respectively arranged at each cross point of the third row ROW2, the second dummy row DROW1, the fifth column COLUMN4 and the sixth column COLUMN5 are referred to as a seventh pixel block, and four pixels Gr8, R8, B8 and Gb8 respectively arranged at each cross point of the second row ROW1, the third row ROW2, the seventh column COLUMN6 and the eighth column COLUMN7 are referred to as an eighth pixel block.

In this case, the even-numbered pixel blocks on a column basis among the first to eighth pixel blocks, i.e., the second pixel block, the fourth pixel block, the sixth pixel block and the eighth pixel block, may have a structure which is shifted by one row as compared with the odd-numbered pixel bocks on a column basis among the first to eighth pixel blocks, i.e., the first pixel block, the third pixel block, the fifth pixel block and the seventh pixel block. In other words, the odd-numbered pixel blocks and the even-numbered pixel blocks may be arranged in a zigzag shape on a row direction basis. Each of the first to eighth pixel blocks may have a shared pixel structure. For example, the shared pixel structure may include a structure in which four photo diodes share a single floating diffusion node. Since the shared pixel structure is widely known to those skilled in the art, a detailed description thereon is omitted herein.

The odd-numbered pixel bocks may be arranged in a first color pattern. For example, the first color pattern may include a Bayer pattern. In the Bayer pattern, a blue color pixel B# and a red color pixel R# may be arranged to face each other in a diagonal direction, and two green color pixels Gr# and Gb# may be arranged on the other corners. On the other hand, the even-numbered pixel blocks may be arranged in a second color pattern. For example, in the second color pattern, a blue color pixel B#, a red color pixel R# and two green color pixels Gr# and Gb# may be arranged not to overlap the color pixels of the Bayer pattern.

The first and third pixel blocks may sequentially output first and third pixel signals VPX<0> and VPX<2> having pixel information on the same color to the first and third column lines CL0 and CL2 four times in a first color order during first and second single row times. For example, the first and third pixel blocks may output the first and third pixel signals VPX<0> and VPX<2> corresponding to a green color Gb after outputting the first and third pixel signals VPX<0> and VPX<2> corresponding to a blue color B during the first single row time assigned to the first row ROW0, and may output the first and third pixel signals VPX<0> and VPX<2> corresponding to a red color R, after outputting the first and third pixel signals VPX<0> and VPX<2> corresponding to a green color Gr during the second single row time assigned to the second row ROW1, based on a second selection control signal SX<1>, a third reset control signal RX<2>, a first transmission control signal group TX0<1> and TX1<1>, and a second transmission control signal group TX0<2> and TX1<2>. To be specific, the first pixel block may output the first pixel signal VPX<0> corresponding to the green color Gb after outputting the first pixel signal VPX<0> corresponding to the blue color B during the first single row time based on the second selection control signal SX<1>, the third reset control signal RX<2>, and the first transmission control signal group TX0<1> and TX1<1>. The first pixel block may output the first pixel signal VPX<0> corresponding to the red color R, after outputting the first pixel signal VPX<0> corresponding to the green color Gr during the second single row time based on the second selection control signal SX<1>, the third reset control signal RX<2>, and the second transmission control signal group TX0<2> and TX1<2>.

The second and fourth pixel blocks may output second and fourth pixel signals VPX<1> and VPX<3> to the second and fourth column lines CL1 and CL3 two times during the first single row time. For example, the second and fourth pixel blocks may output the second and fourth pixel signals VPX<1> and VPX<3> corresponding to the green color Gb after outputting the second and fourth pixel signals VPX<1> and VPX<3> corresponding to the blue color B during the first single row time based on a first selection control signal SX<0>, a second reset control signal RX<1>, and the first transmission control signal group TX0<1> and TX1<1>.

The fifth and seventh pixel block may output the first and third pixel signals VPX<0> and VPX<2> to the first and third column lines CL0 and CL2 two times during a third single row time. For example, the third and seventh pixel blocks may output the first and third pixel signals VPX<0> and VPX<2> corresponding to the green color Gb after outputting the first and third pixel signals VPX<0> and VPX<2> corresponding to the blue color B during the third single row time assigned to the third row ROW2 based on a fourth selection control signal SX<3>, a fifth reset control signal RX<4>, and a third transmission control signal group TX0<3> and TX1<3>.

The sixth and eighth pixel blocks may sequentially output the second and fourth pixel signals VPX<1> and VPX<3> having pixel information on the same color to the second and fourth column lines CL1 and CL3 four times in a second color order during the second and third single row times. For example, the sixth and eighth pixel blocks may output the second and fourth pixel signals VPX<1> and VPX<3> corresponding to the red color R, after outputting the second and fourth pixel signals VPX<1> and VPX<3> corresponding to the green color Gr during the second single row time, and may output the second and fourth pixel signals VPX<1> and VPX<3> corresponding to the green color Gb after outputting the second and fourth pixel signals VPX<1> and VPX<3> corresponding to the blue color B during the third single row time, based on a third selection control signal SX<2>, a fourth reset control signal RX<3>, the second transmission control signal group TX0<2> and TX1<2>, and the third transmission control signal group TX0<3> and TX1<3>. To be specific, the sixth pixel block may output the second pixel signal VPX<1> corresponding to the red color R, after outputting the second pixel signal VPX<1> corresponding to the green color Gr during the second single row time based on the third selection control signal SX<2>, the fourth reset control signal RX<3>, and the second transmission control signal group TX0<2> and TX1<2>. The eighth pixel block may output the fourth pixel signal VPX<3> corresponding to the green color Gb after outputting the fourth pixel signal VPX<3> corresponding to the blue color B during the third single row time based on the third selection control signal SX<2>, the fourth reset control signal RX<3>, and the third transmission control signal group TX0<3> and TX1<3>.

The first to fourth column lines CL0, CL1, CL2 and CL3 may be coupled to the first to eighth pixel blocks. For example, the first column line CL0 may be coupled to the first and fifth pixel blocks in common, and the second column line CL1 may be coupled to the second and sixth pixel blocks in common, and the third column line CL2 may be coupled to the third and seventh pixel blocks in common, and the fourth column line CL3 may be coupled to the fourth and eighth pixel blocks in common. The first column line CL0 may transmit the first pixel signal VPX<0> to the first averaging block 321, and the second column line CL1 may transmit the second pixel signal VPX<1> to the first and second averaging blocks 321 and 323, and the third column line CL2 may transmit the third pixel signal VPX<2> to the second and third averaging blocks 323 and 325, and the fourth column line CL3 may transmit the fourth pixel signal VPX<3> to the third averaging block 325.

The first to third averaging blocks 321, 323 and 325 may group to overlap the first to fourth pixel signals VPX<0:3> into first to third pixel signal groups, and may average the first to third pixel signal groups to generate first to third averaged pixel signals IPX<0:2>. For example, the first to third averaging blocks 321, 323 and 325 may group the first to fourth pixel signals VPX<0:3> by two pixel signals while sharing at least one of two pixel signals with neighboring averaging block. In this case, the first averaging block 321 may group the first and second pixel signals VPX<0:1> as the first pixel signal group and may average the first pixel signal group to generate the first averaged pixel signal IPX<0>, and the second averaging block 323 may group the second and third pixel signals VPX<1:2> as the second pixel signal group and may average the second pixel signal group to generate the second averaged pixel signal IPX<1>, and the third averaging block 325 may group the third and fourth pixel signals VPX<2:3> as the third pixel signal group and may average the third pixel signal group to generate the third averaged pixel signal IPX<2>.

The first to third signal conversion blocks 331, 333 and 335 may convert the first to third averaged pixel signals IPX<0:2> into first to third digital signals D<0:2>. For example, the first to third signal conversion blocks 331, 333 and 335 may detect voltage levels of the first to third averaged pixel signals IPX<0:2> based on a common ramp signal VRAMP and may generate the first to third digital signals D<0:2> corresponding to the detection result.

Figure 10:
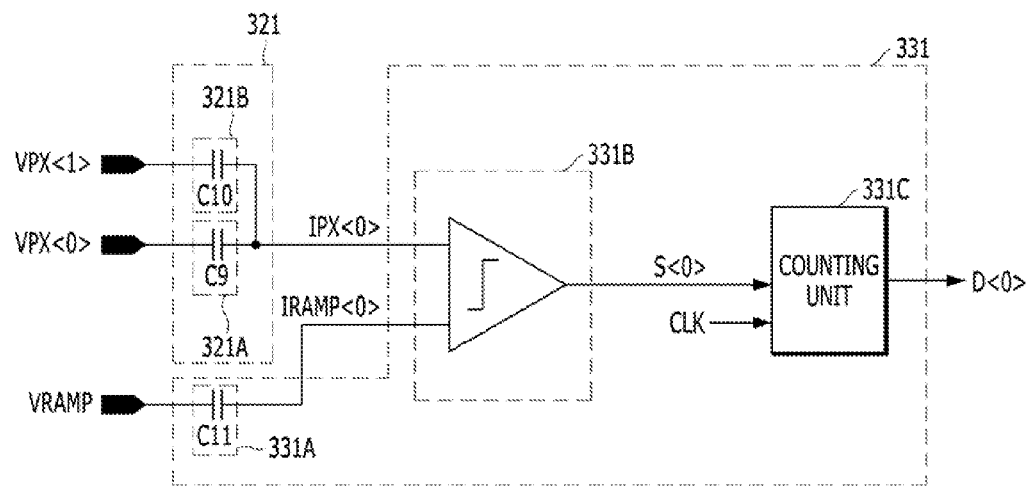
FIG. 10 is a circuit diagram illustrating an example of a first averaging block and a first signal conversion block shown in FIG. 9.

FIG. 10 is a circuit diagram illustrating an example of the first averaging block 321 and the first signal conversion block 331 shown in FIG. 9.

Referring to FIG. 10, the first averaging block 321 may sample the first pixel signal VPX<0> and the second pixel signal VPX<1> as the first pixel signal group and average the first pixel signal group to generate the first averaged pixel signal IPX<0>. For example, the first averaging block 321 may include first and second sampling units 321A and 321B coupled to an output node of the first averaged pixel signal IPX<0> in parallel. The first sampling unit 321A may sample the first pixel signal VPX<0> as the first pixel signal group, and the second sampling unit 321B may sample the second pixel signal VPX<1> as the first pixel signal group. For example, the first sampling unit 321A may include a first capacitor C9, and the second sampling unit 321B may include a second capacitor C10. Each of the first and second capacitors C9 and C10 may have capacitance Cs/2 corresponding to one half of capacitance Cs of a third capacitor C11 included in the first signal conversion block 331. The first to third capacitors C9, C10, and C11 may have a structure corresponding to a correlated double sampling (CDS) circuit.

The first signal conversion block 331 may include a third sampling unit 331A, a comparison unit 331B and a counting unit 331C. The third sampling unit 331A may sample the common ramp signal VRAMP to generate a first ramp signal IRAMP<0>. For example, the third sampling unit 331A may include the third capacitor C11. Although it is described in the embodiments of the present invention that the third sampling unit 331A includes the third capacitor C11, the inventive concept is not limited to this. The third sampling unit 331A may include the third capacitor C11 and a fourth capacitor C12 (not shown) coupled to an output node of the first ramp signal IRAMP<0> in parallel, each of which corresponds to the first and second capacitors C9 and C10. In this case, each of the third and fourth capacitors C11 and C12 may sample the common ramp signal VRAMP and may average the sampled common ramp signals to generate the first ramp signal IRAMP<0>. The first to fourth capacitors C9 to C12 may have the same capacitance Cs/2. The comparison unit 331B may compare the first averaged pixel signal IPX<0> with the first ramp signal IRAMP<0> and may generate a first comparison signal S<0> corresponding to the comparison result. The counting unit 331C may count a clock CLK based on the first comparison signal S<0> and may generate the first digital signal D<0> corresponding to the counting result. Since the comparison unit 331B and the counting unit 331C are widely known to those skilled in the art, detailed descriptions thereon are omitted herein.

Since the second and third averaging blocks 323 and 325 may have the same structure as the first averaging block 321, and the second and third signal conversion blocks 333 and 335 may have the same structure as the first signal conversion block 331, detailed descriptions thereon are omitted herein.

Hereinafter, an operation of the image sensing device 300 having the aforementioned structure in accordance with the embodiment of the present invention is described below with reference to FIGS. 11 and 12.

Figure 11:
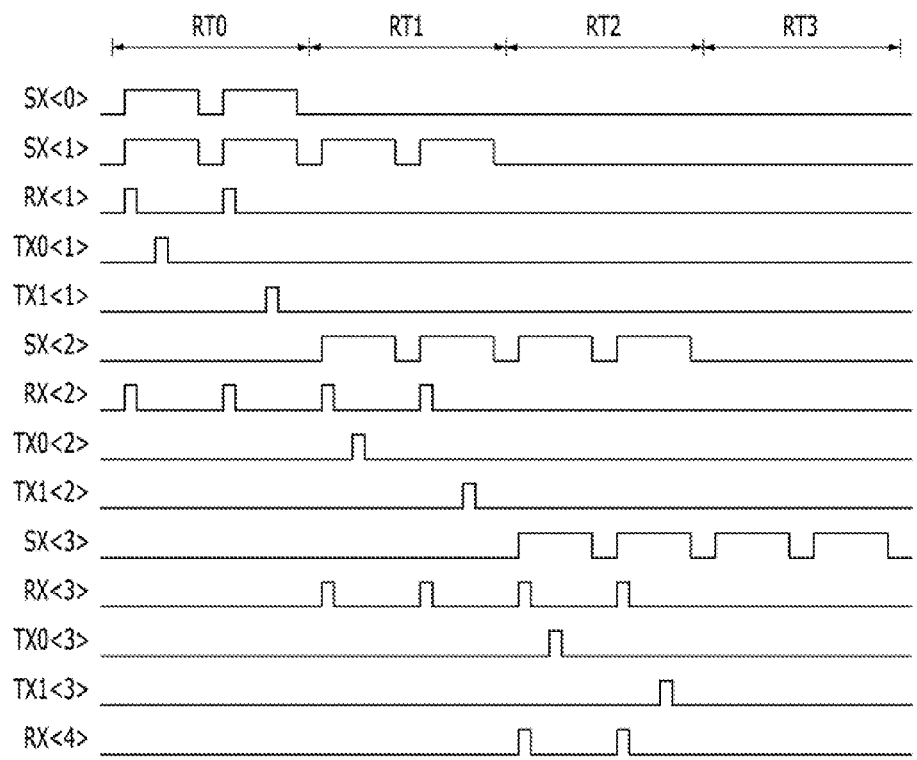
FIG. 11 is a timing diagram illustrating an operation of the image sensing device shown in FIG. 9.

FIG. 11 is a timing diagram illustrating a readout method of the image sensing device 300 shown in FIG. 9. FIG. 12 is a diagram for additionally describing the readout method of the image sensing device 300 shown in FIG. 11.

Referring to FIG. 11, the pixel array 310 may output the first to fourth pixel signals VPX<0:3> corresponding to the green color Gb arranged in the first row ROW0 to the first to fourth column lines CL0, CL1, CL2 and CL3 after outputting the first to fourth pixel signals VPX<0:3> corresponding to the blue color B arranged in the first row ROW0 to the first to fourth column lines CL0, CL1, CL2 and CL3 during a first single row time RT0 assigned to the first row ROW0.

For example, the first and third pixel blocks may output the first and third pixel signals VPX<0> and VPX<2> corresponding to the pixels Gb1 and Gb3 in the green color Gb arranged in the first row ROW0 to the first and third column lines CL0 and CL2 after outputting the first and third pixel signals VPX<0> and VPX<2> corresponding to the pixels B1 and B3 in the blue color B arranged in the first row ROW0 to the first and third column lines CL0 and CL2 during the first single row time RT0 based on the second selection control signal SX<1>, the third reset control signal RX<2>, and the first transmission control signal group TX0<1> and TX1<1>. The second and fourth pixel blocks may output the second and fourth pixel signals VPX<1> and VPX<3> corresponding to the pixels Gb2 and Gb4 in the green color Gb arranged in the first row ROW0 to the second and fourth column lines CL1 and CL3 after outputting the second and fourth pixel signals VPX<1> and VPX<3> corresponding to the pixels B2 and B4 in the blue color B arranged in the first row ROW0 to the second and fourth column lines CL1 and CL3 during the first single row time RT0 based on the first selection control signal SX<0>, the second reset control signal RX<1>, and the first transmission control signal group TX0<1> and TX1<1>.

The pixel array 310 may output the first to fourth pixel signals VPX<0:3> corresponding to the red color R arranged in the second row ROW1 to the first to fourth column lines CL0, CL1, CL2 and CL3 after outputting the first to fourth pixel signals VPX<0:3> corresponding to the green color Gr arranged in the second row ROW1 to the first to fourth column lines CL0, CL1, CL2 and CL3 during a second single row time RT1 assigned to the second row ROW1.

For example, the first and third pixel blocks may output the first and third pixel signals VPX<0> and VPX<2> corresponding to the pixels R1 and R3 in the red color R arranged at the cross point of the second row ROW1 to the first and third column lines CL0 and CL2 after outputting the first and third pixel signals VPX<0> and VPX<2> corresponding to the pixels Gr1 and Gr3 in the green color Gr arranged at the cross point of the second row ROW1 to the first and third column lines CL0 and CL2 during the second single row time RT1 based on the second selection control signal SX<1>, the third reset control signal RX<2>, and the second transmission control signal group TX0<2> and TX1<2>. The sixth and eighth pixel blocks may output the second and fourth pixel signals VPX<1> and VPX<3> corresponding to the pixels R6 and R8 In the red color R arranged at the cross point of the second row ROW1 to the second and fourth column lines CL1 and CL3 after outputting the second and fourth pixel signals VPX<1> and VPX<3> corresponding to the pixels Gr6 and Gr8 in the green color Gr arranged in the second row ROW1 to the second and fourth column lines CL1 and CL3 during the second single row time RT1 based on the third selection control signal SX<2>, the fourth reset control signal RX<3>, and the second transmission control signal group TX0<2> and TX1<2>.

The pixel array 310 may output the first to fourth pixel signals VPX<0:3> corresponding to the green color Gb arranged in the third row ROW2 to the first to fourth column lines CL0, CL1, CL2 and CL3 after outputting the first to fourth pixel signals VPX<0:3> corresponding to the blue color B arranged in the third row ROW2 to the first to fourth column lines CL0, CL1, CL2 and CL3 during a third single row time RT2 assigned to the third row ROW2.

For example, the fifth and seventh pixel blocks may output the first and third pixel signals VPX<0> and VPX<2> corresponding to the pixels Gb5 and Gb7 in the green color Gb arranged at the cross point of the third row ROW2 to the first and third column lines CL0 and CL2 after outputting the first and third pixel signals VPX<0> and VPX<2> corresponding to the pixels B5 and B7 in the blue color B arranged at the cross point of the third row ROW2 to the first and third column lines CL0 and CL2 during the third single row time RT2 based on the fourth selection control signal SX<3>, the fifth reset control signal RX<4>, and the third transmission control signal group TX0<3> and TX1<3>. The sixth and eighth pixel blocks may output the second and fourth pixel signals VPX<1> and VPX<3> corresponding to the pixels Gb6 and Gb8 in the green color Gb arranged at the cross point of the third row ROW2 to the second and fourth column lines CL1 and CL3 after outputting the second and fourth pixel signals VPX<1> and VPX<3> corresponding to the pixels B6 and B8 in the blue color B arranged in the third row ROW2 to the second and fourth column lines CL1 and CL3 during the third single row time RT2 based on the third selection control signal SX<2>, the fourth reset control signal RX<3>, and the third transmission control signal group TX0<3> and TX1<3>.

The first averaging block 321 may average the first and second pixel signals VPX<0:1> having pixel information on the same color and may generate the first averaged pixel signal IPX<0> by row during the first to third single row times RT0, RT1 and RT2. The second averaging block 323 may average the second and third pixel signals VPX<1:2> having pixel information on the same color and may generate the second averaged pixel signal IPX<1> by row during the first to third single row times RT0, RT1 and RT2. The third averaging block 325 may average the third and fourth pixel signals VPX<2:3> having pixel information on the same color and may generate the third averaged pixel signal IPX<2> by row during the first to third single row times RT0, RT1 and RT2. For example, the first averaging block 321 may sample the first and second pixel signals VPX<0:1> as the first pixel signal group, and may average the first pixel signal group to generate the first averaged pixel signal IPX<0>. The second averaging block 323 may sample the second and third pixel signals VPX<1:2> as the second pixel signal group, and may average the second pixel signal group to generate the second averaged pixel signal IPX<1>. The third averaging block 325 may sample the third and fourth pixel signals VPX<2:3> as the third pixel signal group, and may average the third pixel signal group to generate the third averaged pixel signal IPX<2>.

The first to third signal conversion blocks 331, 333 and 335 may generate the first to third digital signals D<0:2> by row based on the common ramp signal VRAMP and the first to third averaged pixel signals IPX<0:2>. As shown in FIG. 12, the first to third digital signals D<0:2> generated by row may correspond to result data B12, . . . , and Gb78 obtained by interpolating the pixel signals having the same color.

In accordance with the embodiment of the present invention described above, with the advantage described in the first embodiment, there is an advantage in that fixed pattern noise (FPN) may be reduced as a color disposition of some pixel blocks is changed.

In accordance with the embodiments of the present invention, resolution may not deteriorate and at least one among a signal-to-noise ratio (SNR) and fixed pattern noise (FPN) may be improved as pixel signals to be read out are interpolated.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

For example, although an image sensing device having a shared pixel structure of 2*2 unit is described in the embodiments of the present invention, the inventive concept is not limited to this, and the present invention may be applied to all image sensing devices having a shared pixel structure of a*b unit (were a and b are natural numbers equal to or greater than 1).

What is claimed is:

1. An image sensing device comprising:
    a pixel array including a plurality of pixels arranged at each cross point of rows and columns, wherein the pixel array comprises a plurality of pixel blocks, each including N pixels, N being a natural number equal to or greater than 2, wherein the pixel blocks sequentially output a plurality of pixel signals having pixel information on the same color N times during one or more single row times;
    a plurality of column lines suitable for sequentially transferring the plurality of pixel signals from the pixel blocks, each column line being shared by two adjacent columns and coupled to at least one of the pixel blocks;
    a plurality of averaging blocks suitable for grouping the pixel signals to overlap each other, into a plurality of pixel signal groups, and averaging the pixel signal groups to output a plurality of averaged pixel signals, wherein the number of the averaging blocks is smaller than the number of the column lines; and
    a plurality of conversion blocks suitable for converting the averaged pixel signals into a plurality of digital signals.

2. The image sensing device of claim 1, wherein each of the pixel blocks have a shared pixel structure.

3. The image sensing device of claim 1, wherein the N pixels included each of the first to $X^{th}$ pixel blocks are arranged in a predetermined color pattern.

4. The Image sensing device of claim 1, wherein the N pixels included each of odd-numbered pixel blocks among the first to $X^{th}$ pixel blocks are arranged in a first color pattern, and
    the N pixels included each of even-numbered pixel blocks among the first to $X^{th}$ pixel blocks are arranged in a second color pattern different from the first color pattern.

5. The image sensing device of claim 1, wherein each of the first to $Z^{th}$ averaging blocks groups the first to $X^{th}$ pixel signals by two pixel signals while sharing at least one of the two pixel signals with a neighboring averaging block, and averages the first to $Z^{th}$ pixel signal groups, where Z is equal to X−1.

6. The image sensing device of claim 1, wherein each of the first to $Z^{th}$ averaging blocks samples the first to $X^{th}$ pixel signals to the first to $Z^{th}$ pixel signal groups, and averages the first to $Z^{th}$ pixel signal groups to generate the first to $Z^{th}$ averaged pixel signals.

7. An image sensing device comprising:
    first to $X^{th}$ column lines, where X is a natural number equal to or greater than 2;
    odd-numbered pixel blocks, each including N pixels coupled to odd-numbered column lines among the first to $X^{th}$ column lines and suitable for sequentially outputting odd-numbered pixel signals having pixel information on the same color to the odd-numbered column lines N times in a first color order during a plurality of first single row times, where N is a natural number equal to or greater than 2;
    even-numbered pixel blocks, each including N pixels coupled to even-numbered column lines among the first to $X^{th}$ column lines and suitable for sequentially outputting even-numbered pixel signals having pixel information on the same color to the even-numbered column lines N times in a second color order during a plurality of second single row times;
    first to $Z^{th}$ averaging blocks suitable for grouping first to $X^{th}$ pixel signals outputted through the first to $X^{th}$ column lines to overlap each other into first to $Z^{th}$ pixel signal groups, and averaging the first to $Z^{th}$ pixel signal groups to output first to $Z^{th}$ averaged pixel signals, where Z is a natural number smaller than X; and
    first to $Z^{th}$ signal conversion blocks suitable for converting the first to $Z^{th}$ averaged pixel signals into first to $Z^{th}$ digital signals.

8. The image sensing device of claim 7, wherein the odd-numbered pixel blocks and the even-numbered pixel blocks are arranged in a zigzag shape on a row direction basis.

9. The image sensing device of claim 8, wherein each of the odd-numbered pixel blocks includes a plurality of first pixels arranged in a first color pattern, and
    each of the even-numbered pixel blocks includes a plurality of second pixels arranged in a second color pattern different from the first color pattern.

10. The image sensing device of claim 9, wherein the first pixels and the second pixels have a shared pixel structure.

11. The image sensing device of claim 9, wherein at least one of the first pixels and at least one of the second pixels are arranged in the same row.

12. The image sensing device of claim 7, wherein the first single row times and the second single row times include at least one third single row time.

13. The image sensing device of claim 12, wherein the odd-numbered pixel blocks and the even-numbered pixel blocks output the first to $X^{th}$ pixel signals having pixel information on the same color to the first to $X^{th}$ column lines during the third single row time.

14. The image sensing device of claim 7, wherein each of the first to $Z^{th}$ averaging blocks groups the first to $X^{th}$ pixel signals by two pixel signals while sharing at least one of the two pixel signals with a neighboring averaging block, and averages the first to $Z^{th}$ pixel signal groups, where Z is equal to X−1.

15. The image sensing device of claim 7, wherein each of the first to $Z^{th}$ averaging blocks samples the first to $X^{th}$ pixel signals to the first to $Z^{th}$ pixel signal groups, and averages the first to $Z^{th}$ pixel signal groups to generate the first to $Z^{th}$ averaged pixel signals.

16. An image sensing device comprising:
   first to $X^{th}$ column lines, where X is a natural number equal to or greater than 2;
   odd-numbered pixel blocks coupled to odd-numbered column lines among the first to $X^{th}$ column lines, and each including a shared pixel structure and N first pixels arranged in a first color pattern, where N is a natural number equal to or greater than 2; and
   even-numbered pixel blocks coupled to even-numbered column lines among the first to $X^{th}$ column lines, and each including the shared pixel structure and N second pixels arranged in a second color pattern.

17. The image sensing device of claim 16, wherein the odd-numbered pixel blocks and the even-numbered pixel blocks sequentially output first to $X^{th}$ pixel signals having pixel information on the same color to the first to $X^{th}$ column lines N times in a preset color order during one or more single row times.

18. The image sensing device of claim 17, further comprising:
   first to $Z^{th}$ averaging blocks suitable for grouping the first to $X^{th}$ pixel signals to overlap each other into first to $Z^{th}$ pixel signal groups, and averaging the first to $Z^{th}$ pixel signal groups to output first to $Z^{th}$ averaged pixel signals, where Z is a natural number smaller than X; and
   first to $Z^{th}$ signal conversion blocks suitable for converting the first to $Z^{th}$ averaged pixel signals into first to $Z^{th}$ digital signals.

19. The image sensing device of claim 16, wherein the odd-numbered pixel blocks sequentially output odd-numbered pixel signals having pixel information on the same color to the odd-numbered column lines N times in a first color order during a plurality of first single row times, and
   the even-numbered pixel blocks sequentially output even-numbered pixel signals having pixel information on the same color to the even-numbered column lines N times in a second color order during a plurality of second single row times.

20. The image sensing device of claim 19, further comprising:
   first to $Z^{th}$ averaging blocks suitable for grouping the first to $X^{th}$ pixel signals outputted through the first to $X^{th}$ column lines to overlap each other into first to $Z^{th}$ pixel signal groups, and averaging the first to $Z^{th}$ pixel signal groups to output first to $Z^{th}$ averaged pixel signals, where Z is a natural number smaller than X; and
   first to $Z^{th}$ signal conversion blocks suitable for converting the first to $Z^{th}$ averaged pixel signals into first to $Z^{th}$ digital signals.

* * * * *